(12) United States Patent
Naik et al.

(10) Patent No.: US 6,704,648 B1
(45) Date of Patent: Mar. 9, 2004

(54) BEARING DATA FOR ROUTE GUIDANCE

(75) Inventors: Kirit Naik, Carol Stream, IL (US); Richard Malingkas, Mt. Prospect, IL (US); K C Dayananda, Des Plaines, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 10/157,753

(22) Filed: May 29, 2002

(51) Int. Cl.[7] .............................................. G01C 21/32
(52) U.S. Cl. ...................... 701/208; 701/201; 701/206; 701/211; 701/212; 340/990; 340/995.1
(58) Field of Search ................................ 701/200, 201, 701/206, 207, 208, 211, 212, 214; 340/988, 990, 995.1

(56) References Cited

U.S. PATENT DOCUMENTS

| | | | | |
|---|---|---|---|---|
| 5,802,492 A | * | 9/1998 | DeLorme et al. | 701/201 |
| 6,199,013 B1 | | 3/2001 | O'Shea | 701/211 |
| 6,405,131 B1 | | 6/2002 | Barton | 701/211 |
| 2002/0040271 A1 | | 4/2002 | Park et al. | 701/209 |

FOREIGN PATENT DOCUMENTS

EP 0838663 A2 4/1998 ........... G01C/21/20

* cited by examiner

*Primary Examiner*—Gertrude A. Jeanglaude
(74) *Attorney, Agent, or Firm*—Frank J. Kozak; Jon D. Shotter; Lawrence M. Kaplan

(57) ABSTRACT

The bearing of a road segment indicates the direction that the segment follows from an end thereof. A primary bearing of a road segment is determined with respect to a significant shape point located along the road segment. The significant shape point is not necessarily the shape point closest to the end point, but is that shape point located within or beyond a predetermined range of distance from the end point. A secondary bearing is determined for some road segments. The secondary bearing indicates the general direction that a road segment follows leading away from an end point. The secondary bearing is determined using a view distance. The view distance is based on attributes of the road segment and represents an estimate of the distance of the driver's field of view as he/she approaches the intersection. Data indicating the primary and secondary bearing can be stored in a geographic database used by a navigation system. A navigation system application uses the primary and secondary bearing data to explicate driving maneuvers.

29 Claims, 10 Drawing Sheets

FIG. 9
(PRIOR ART)
FIG. 10
(PRIOR ART)
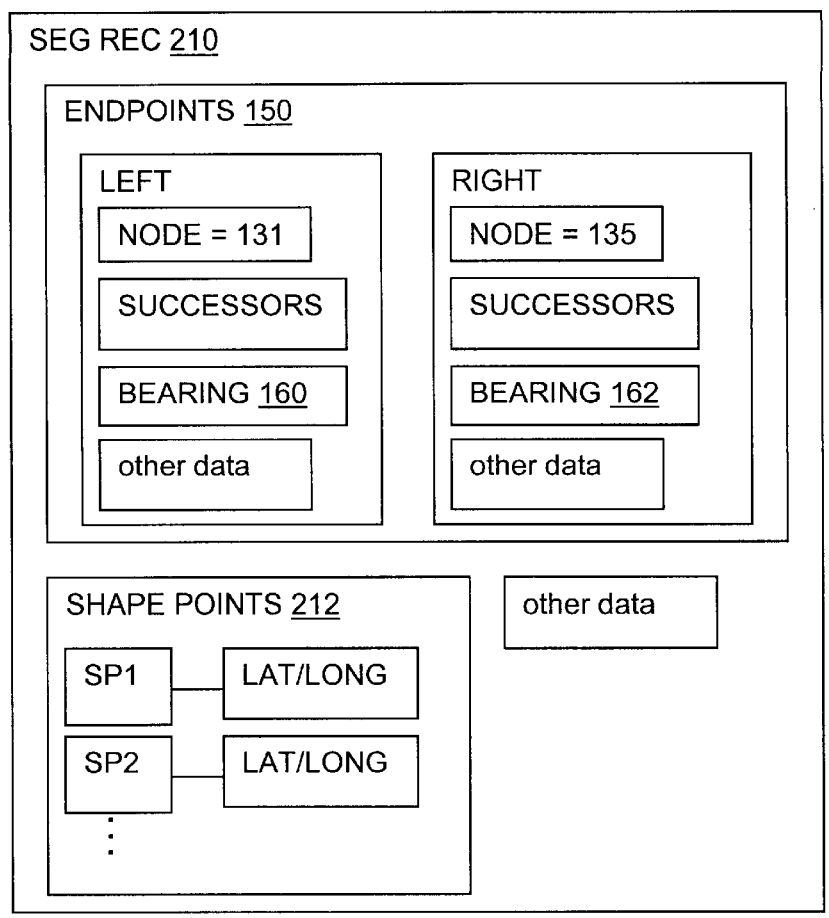
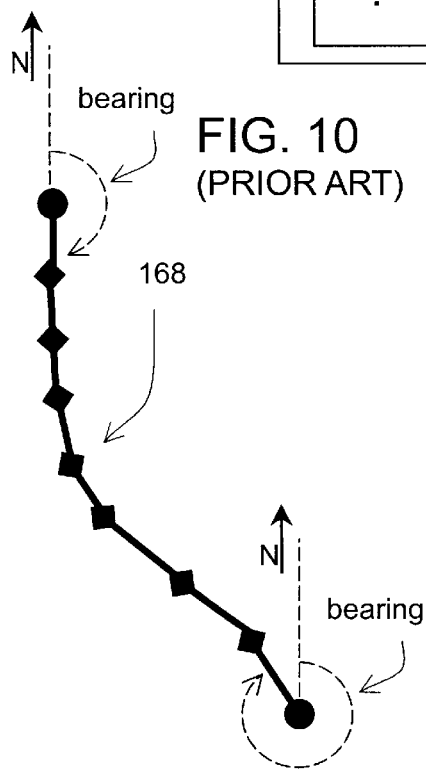

BEARING DATA FOR ROUTE GUIDANCE

BACKGROUND OF THE INVENTION

The present invention relates to providing route guidance with a navigation system, and more particularly, the present invention relates to an improved way to determine bearing data to provide guidance at intersections along a route with a navigation system.

Navigation systems are available that provide end users (such as drivers and passengers of the vehicles in which the navigation systems are installed) with various useful navigation-related features. Some navigation systems are able to determine an optimum route to travel by roads between locations in a geographic region. Using input from the end user, and optionally from equipment that can determine one's physical location (such as a GPS system), a navigation system can determine an optimum route (i.e., fastest, shortest, etc.) to travel from a starting location to a destination location in a geographic region. The navigation system can then provide the end user with information about the route in the form of guidance that identifies the driving maneuvers required to be taken by the end user to travel from the starting location to the destination location. The guidance may take the form of visual and/or audio instructions that are provided along the way as the end user is traveling the route. In some navigation systems, guidance about a required upcoming maneuver is provided as the location of the required maneuver is being approached. As an example, the guidance may indicate that the driver should keep to the left and make a sharp left turn at the upcoming intersection.

In order to provide these and other navigating functions, navigation systems use geographic data that represent physical features in a geographic region. The geographic data represent the roads and intersections in a geographic region and also may include information relating to the represented roads and intersections, such as turn restrictions at intersections, speed limits along the roads, street names of the various roads, address ranges along the roads, and so on. The geographic data are contained and organized in one or more databases.

In order to provide guidance about required maneuvers, an application in the navigation system evaluates data that relate to each intersection in a route to determine whether guidance should be provided at the intersection. If the navigation system application determines that guidance should be provided at an intersection, then the navigation system application also determines what kind of guidance to provide. A navigation system application that performs these functions is disclosed in U.S. Pat. No. 6,199,013, the entire disclosure of which is incorporated by reference herein.

There are various types of data that relate to an intersection in a route that can be evaluated by a navigation system application in order to determine what type of route guidance, if any, to provide. When evaluating an intersection along a route for this purpose, one of the factors to be considered is the size of the turn angle that is required in order to proceed through the intersection along the route. The size of the turn angle required to proceed through an intersection along a route is the angle made by the road segment leading into the intersection with the route segment leading out of the intersection. For example, if no turn is required at an intersection (i.e., the route proceeds straight through the intersection), the turn angle is approximately 180°. If the turn angle is approximately 180°, no guidance may be needed. On the other hand, if a driver is required to make a left turn at an intersection onto another street to continue along a route, the turn angle is approximately 90°. Under these circumstances, guidance in the form of audible or visual instructions may be needed.

One way to improve operation of a navigation system is to include data in the geographic database used by the navigation system to facilitate certain calculations required by applications in the navigation system. As an example, to facilitate determining the turn angle required to proceed through an intersection, the geographic database used by a navigation system can include data that indicate the bearing of a road segment at each of its endpoints. The bearing of a road segment at each of its endpoints indicates the angle made by the road segment at that endpoint with a predetermined direction (e.g., north). FIGS. 1–10 illustrate examples of how bearing data can be represented in a geographic database used by a navigation system.

FIG. 1 is an illustration of a portion of a road network in a geographic area 100. Four road segments 102, 104, 106 and 108 meet at an intersection 110. The road segment 102 extends between the intersection 110 and the intersection 114, the road segment 104 extends between the intersection 110 and the intersection 116, the road segment 106 extends between the intersection 110 and the intersection 118, and the road segment 108 extends between the intersection 110 and the intersection 112.

FIG. 2 illustrates how these features are represented in a geographic database 120. In the geographic database 120, road segments are represented by road segment data records 121 and nodes (i.e., including intersections) are represented by node data records 130. Road segment 102 is represented by the segment data record 122, road segment 104 is represented by the segment data record 124, road segment 106 is represented by the segment data record 126, and road segment 108 is represented by the segment data record 128. Likewise, each intersection is represented by a node data record. Intersection 110 is represented by the node data record 131, intersection 112 is represented by the node data record 133, intersection 114 is represented by the node data record 135, intersection 116 is represented by the node data record 137, and intersection 118 is represented by the node data record 139. Other road segments and intersections in the geographic area 100 are represented by other data records in the geographic database 120. In addition, the geographic database 120 may include other types of data 140. These other types of data may represent points of interest, towns, cities, counties, states, countries, rivers, lakes, recreational areas, etc.

FIG. 3 is a block diagram that shows some of the components of the road segment data record 122 in the geographic database 120. In FIG. 3, the road segment data record 122 includes data 150 that identify the end points of the road segment. The end points are identified by the node data records (i.e., 131 and 135) that represent the nodes at the end points of the represented road segment 102. The road segment data record 122 also includes data 154 that indicate the successors at each end point. The successors at an end point of a road segment are those other road segments that are accessible via that end point. As shown in FIG. 1, the successors of the road segment 102 via the intersection 110 are the road segments 104, 106 and 108. Accordingly, the data record 122 (in FIG. 3) that represents the road segment 102 includes data 154 that identify these successors. In the data record 122, the successors of the road segment 102 via the intersection 110 are identified by their corresponding road segment data records 124, 126, and 128.

The road segment record 122 also includes data 160 and 162 that indicate the bearing at each endpoint of the road segment. As mentioned above, the bearing of a road segment at one of its end points indicates the angle made by the road segment at that endpoint with a predetermined direction, such as north. FIG. 4 is a graphical representation of the geographic features shown in FIG. 1 formed using the data representations of these features contained in the geographic database 120 of FIG. 2. FIG. 5 is a graphical representation of the road segment 102 in FIG. 1 formed using the data record 122 in FIG. 3. FIG. 5 illustrates the bearings, 160 and 162, at the end points 110 and 114, respectively, of the road segment 102 (represented by data record 122). As indicated in FIG. 5, the bearing of a road segment at each end point is the angle made by the end of the road segment with north. Data indicating these angles are stored in the data record (122 in FIG. 3) that represent this road segment. The bearing data may be stored as an angle or as a fraction (e.g., $n/256^{th}$) of a circle.

The data records (e.g., 122, 124 in FIG. 2) that represent road segments include (or point to) data that identify the locations of the represented road segments. In the geographic database 120 of FIG. 2, the locations of the represented road segments are indicated using the node data records 130. FIG. 6 shows the node data record 131 that represents the intersection 110 in FIG. 1. In FIG. 6, the node data record 131 includes data 170 that indicate the location (i.e., the geographic coordinates, such as the latitude and longitude) and optionally the altitude of the represented node/intersection. Referring again to FIG. 3, the road segment record 122 includes data that refers to the node data records (131 and 135) that represent the nodes at the end points of the represented road segment where the locations of the end points can be found. Because the represented road segment 102 is straight, all locations along the road segment can be determined by calculating a straight line that connects the locations of the end points.

If the road segment is curved (or other-than-straight), the road segment data record includes data by which the shape of the road segment between its end points can be determined. In the geographic database 120 in FIG. 2, curved road segments are represented using shape points. FIG. 7 shows an intersection 190 of three curved road segments 192, 194 and 196. FIG. 8 shows graphically how these road segments are represented using data in the geographic database. As described above, the end points of each road segment are represented by node data records, each of which contains data that indicate the locations (e.g., the geographic coordinates) of the represented node and therefore the locations (e.g., the geographic coordinates) of the end points of the road segments that meet at the node. In addition, one or more shape points are identified along each curved road segment. Shape points are points that coincide with the road segment between the end points thereof. Shape points are used to approximate the curving shape of the represented road segment. The number of shape points stored between a given set of end points depends on the shape of the curve and the accuracy or resolution of the geographic database. Shape points are illustrated along the representations of the road segments in FIG. 8.

In the geographic database, a road segment data record that represents a curved road segment includes data that indicate the locations of one or more shape points. FIG. 9 is an illustration of a road segment data record 210 that includes shape point data 212. The shape point data 212 indicate the locations of the shape points selected by the geographic database developer to represent the curved shape of the represented road segment.

As mentioned above, the bearing of the road segment at one of its end points indicates the angle made by the road segment with north. In prior geographic databases, if a represented road segment is curved, the bearing is represented by the angle made with north by a straight line linking the road segment end point with the shape point immediately adjacent thereto. FIG. 10 illustrates the bearing at each end point of the road segment 192. In prior geographic databases, data indicating the bearing at each end of a curved road segment are stored in the data record that represents the road segment in a similar manner as described above in connection with straight road segments.

As stated above, operation of a navigation system can be improved by storing data in the geographic database that facilitates certain calculations required by applications in the navigation system. The bearing data stored in a geographic database can facilitate determining the turn angle required to proceed through an intersection. If the bearing of the road segment leading into an intersection is approximately opposite (180°) the bearing of the road segment leading out of the intersection, the route proceeds approximately straight through the intersection and no guidance may be needed for that intersection. If the bearing of the road segment leading into an intersection is not approximately opposite the bearing of the road segment leading out of the intersection, appropriate guidance can be determined. By providing the bearing of road segments in a geographic database used by a navigation system, calculation of the turn angle is facilitated.

Although the provision of bearing data in a geographic database used by a navigation system provides advantages, there continues to be room for improvements. For example, in some cases, existing ways of determining the bearing of road segments may lead to results that appear to contradict what the driver observes. This may be due to the geometry of a particular intersection. This may also be due to the selection of shape points around an intersection. This may also be due to the presence of other nearby road segments.

Accordingly, there exists a need for improved ways for representing the bearing of a road segment in order to provide more consistent and meaningful route guidance.

SUMMARY OF THE INVENTION

To address these and other objectives, the present invention includes ways to provide improved route guidance with a navigation system. Route guidance with a navigation system can be improved by modifying and/or augmenting data that represent the bearings of road segments represented in a geographic database used by the navigation system. According to one aspect, a first or primary bearing is determined with respect to each end point of each road segment represented by the geographic database. The primary bearing at an end point of a road segment indicates the angle made with a predetermined direction (e.g., north) by a straight line between the end point and a significant shape point located along the road segment. The significant shape point is not necessarily the shape point closest to the end point. Instead, the significant shape point is that shape point located within or beyond a predetermined range of distance from the end point. Data indicating the primary bearing are stored in the geographic database used by the navigation system.

According to another aspect, a secondary bearing is determined for at least some of the road segments represented in the geographic database used by the navigation system. The secondary bearing indicates the angle between a predetermined direction (i.e., north) and a line extending from the farthest shape point within a view distance to the next shape point. View distance represents an estimate of the distance of the driver's field of view as he/she approaches the intersection. The view distance is based on attributes of the road segment including an estimated width of the road and an estimated speed of the vehicle. Data indicating the secondary bearing are stored in the geographic database used by the navigation system. The secondary bearing data are provided in the geographic database in addition to the primary bearing data.

According to another aspect, the navigation system includes an application that provides route guidance. The application evaluates data that relate to an intersection along a calculated route, including the primary bearing data and the secondary bearing data. The combination of primary bearing data and the secondary bearing data are used to provide appropriate instructions for traveling through the intersection.

BRIEF DESCRIPTION OF THE DRAWINGS

FIG. 9 is a block diagram that shows some of the components of a road segment data record that represents the road segment shown in FIG. 8.

FIG. 10 is a graphical representation illustrating the bearing of the road segment shown in FIG. 8.

DETAILED DESCRIPTION OF THE PRESENTLY PREFERRED EMBODIMENTS

I. Overview

Figure 1:
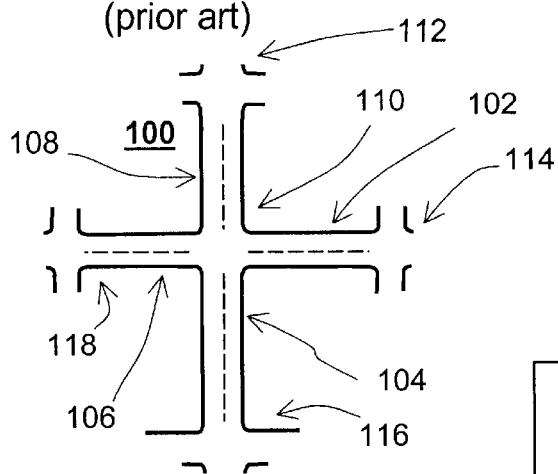
FIG. 1 is an illustration of a portion of a road network in a geographic area.
Figure 2:
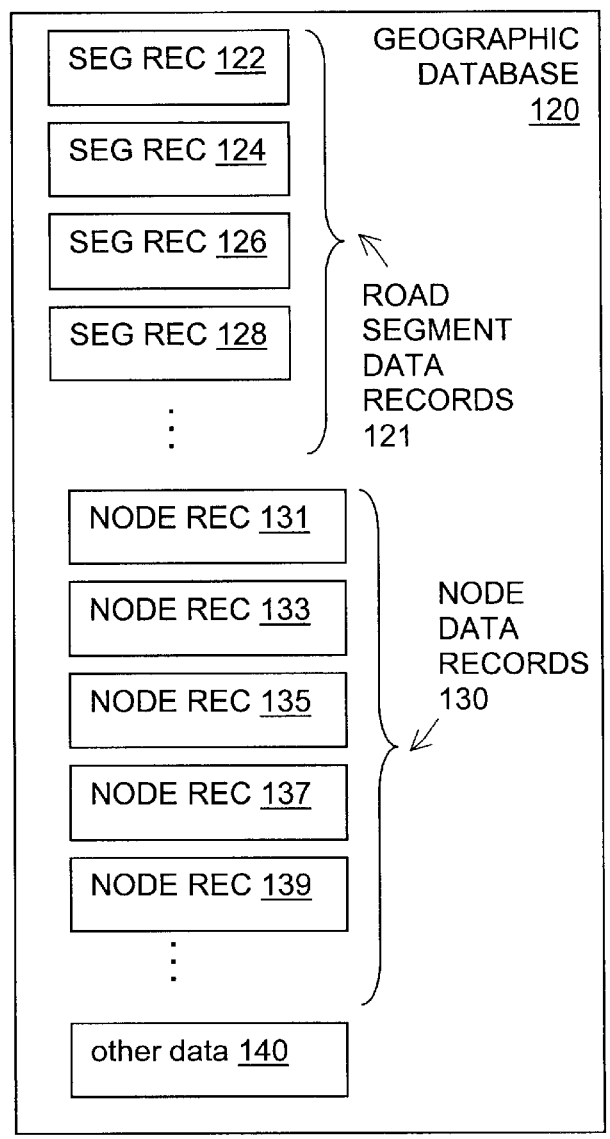
FIG. 2 is a block diagram showing components of a prior art geographic database that includes data that represent the features shown in FIG. 1.
Figure 3:
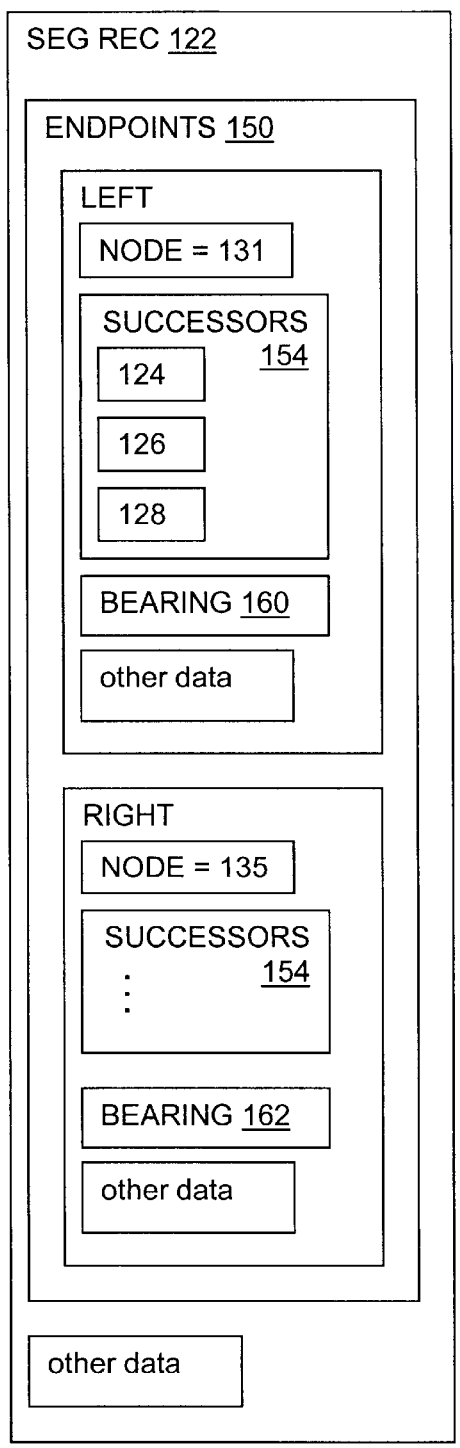
FIG. 3 is a block diagram that shows some of the components of one of the road segment data records in the geographic database in FIG. 2.
Figure 4:
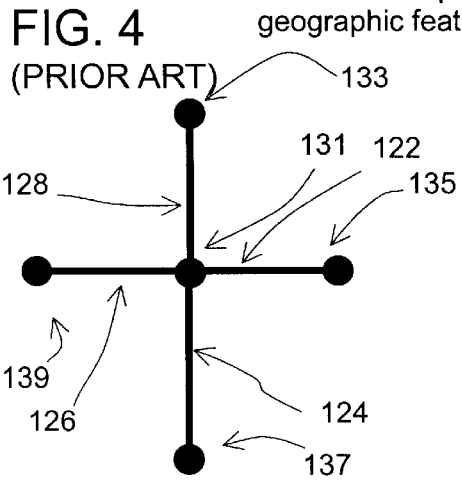
FIG. 4 is a graphical representation of the intersection shown in FIG. 1.
Figure 5:
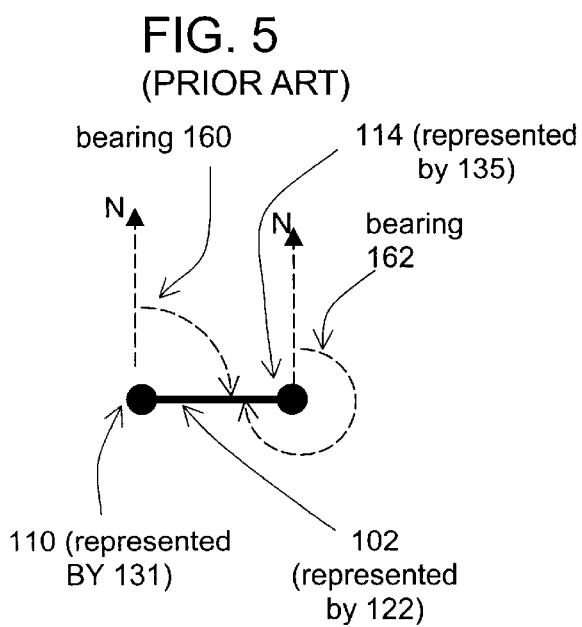
FIG. 5 is a graphical representation illustrating the bearing of one of the road segments shown in FIG. 1.
Figure 6:
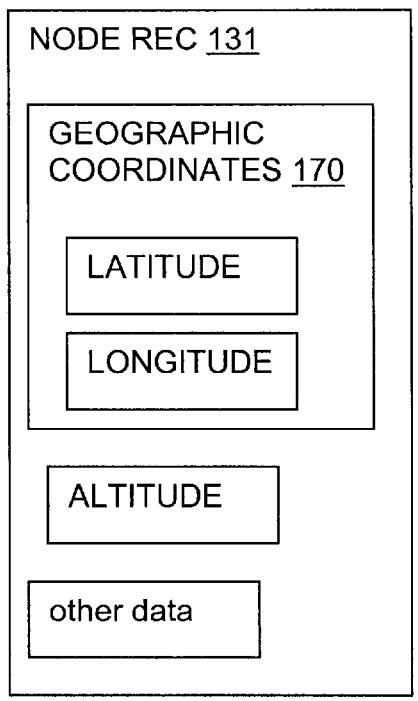
FIG. 6 is a block diagram that shows some of the components of one of the node data records in the geographic database in FIG. 2.
Figure 7:
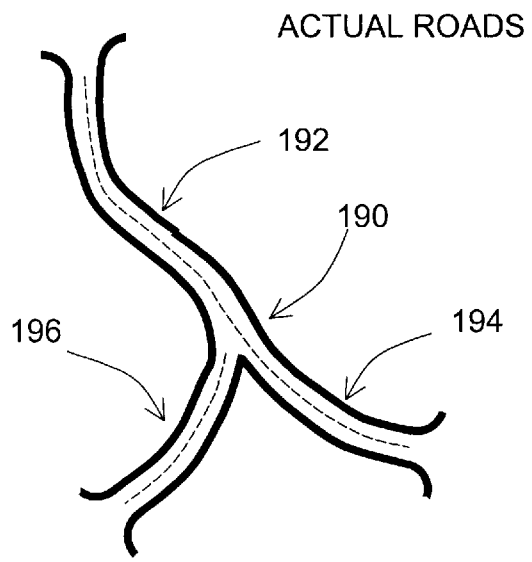
FIG. 7 is an illustration of another portion of the road network located in the geographic area a portion of which is shown in FIG. 1.
Figure 8:
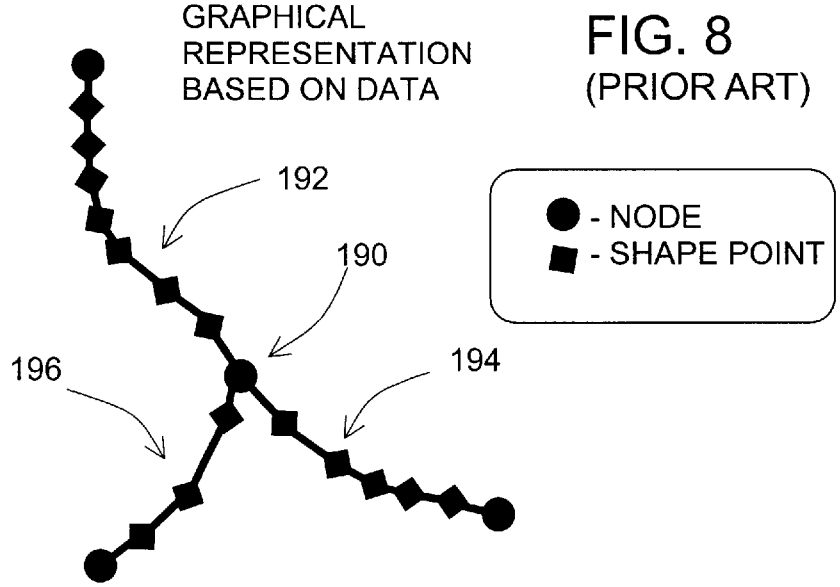
FIG. 8 is a graphical representation of the portion of the road network shown in FIG. 7.

Although the prior ways of determining bearing data have been used by navigation systems to provide useful route guidance, in some cases the route guidance could be made more meaningful. In order to improve the quality of route guidance provided by a navigation system, it has been recognized that a driver perceives a general direction that a road segment takes leading away from an intersection. This general direction is not necessarily the same as the actual direction of the road segment in the immediate vicinity of the intersection. Accordingly, in order to improve the quality of route guidance, the general direction that a road segment takes leading away from an intersection is determined. This general direction is based on what a driver can perceive from the intersection. Data indicating this general direction are stored in the geographic database used by the navigation system.

It is further recognized that the actual direction that a road segment takes leading away from an intersection is useful in some cases. For example, the actual direction that a road segment takes leading away from an intersection is useful in order to distinguish between two closely spaced roads that lead away from the intersection. Accordingly, the actual direction that a road segment takes leading from an intersection is determined and data indicating this actual direction are included in the geographic database used by the navigation system.

The data indicating actual and general directions of road segments are used by an application in the navigation system to provide a vehicle driver with meaningful route guidance.

(For purposes of this disclosure, the actual direction that a road segment takes leading away from an intersection is represented as the primary bearing and the general direction that a road segment takes leading away from the intersection is represented as the secondary bearing.)

II. Use of a Significant Shape Point for Determining the Primary Bearing

When forming a geographic database for a navigation system, an evaluation is made of the geometry relating to the end points of each road segment to be represented. Part of this evaluation includes determining the direction that a road segment takes leading away from each of its endpoints. The actual direction that a road segment takes leading away from an end point is referred to herein as the primary bearing. The primary bearing at the end point of a road segment is determined by calculating the angle made with north by a straight line from the end point to a significant shape point. The significant shape point is determined using the following rules:

1. If a shape point is located within a range of distance of 5 to 10 meters from the end point of a road segment, the last (farthest) shape point within the range is selected as the significant shape point.

2. If no shape point is located within the range of distance of 5 to 10 meters from the end point of the road segment, the first shape point that is more than 10 meters from the end node is selected as the significant shape point.

A significant shape point is not necessarily the shape point closest to an end point. A shape point located less than 5 meters from a node is within the approximate width of a road lane and therefore is not considered significant since it is too close to the node.

Figure 11:
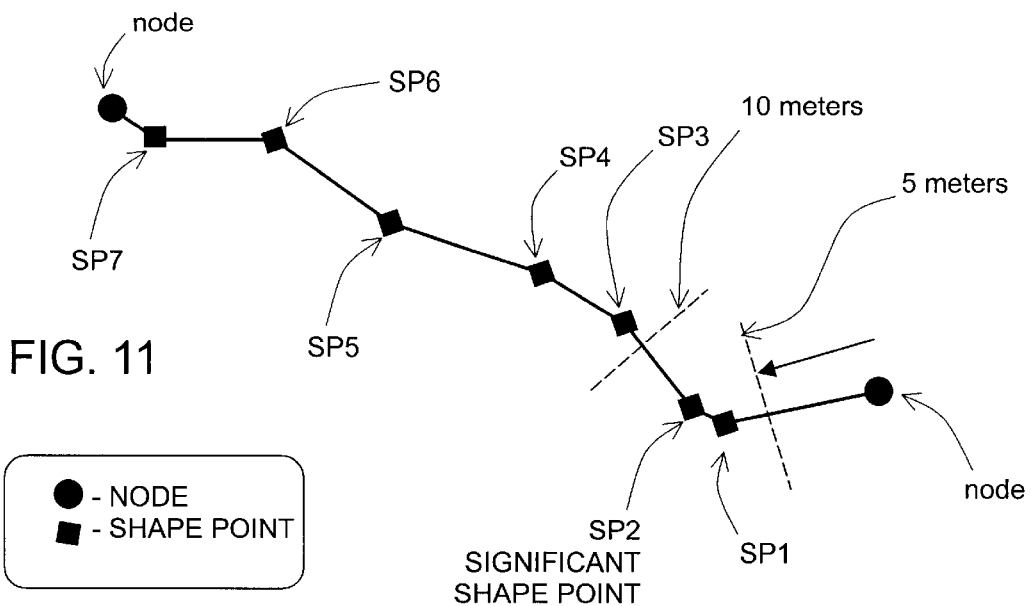
FIG. 11 is a graphical representation illustrating the determination of the primary bearing of a road segment.
Figure 12:
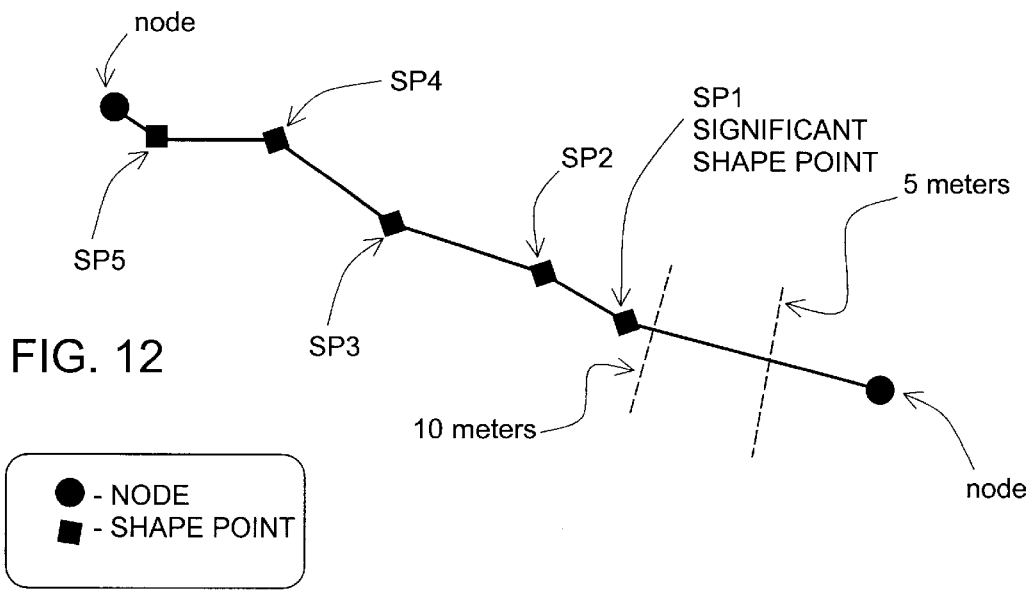
FIG. 12 is another graphical representation illustrating the determination of the primary bearing of a road segment.
Figure 13:
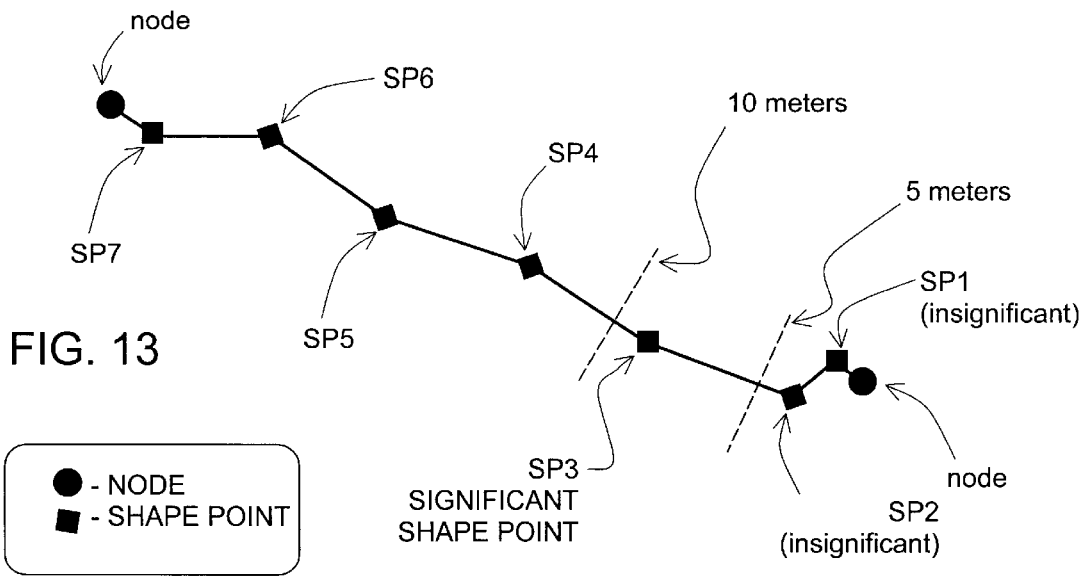
FIG. 13 is still another graphical representation illustrating the determination of the primary bearing of a road segment.

FIGS. 11–13 illustrate use of these rules for selecting the significant shape point for determining the primary bearing.

Once the significant shape point from the end point of a road segment is selected, the primary bearing for that end point can be determined. A straight line connecting the end point and the significant shape point is determined. Then, the angle made by the straight line with north is determined. Data indicating this angle are associated with other data representing this road segment and stored in a geographic database that represents the geographic area. Methods for forming a geographic database are disclosed in U.S. Pat. No. 5,968,109, the entire disclosure of which is incorporated by reference herein.

III. Secondary Bearing

There are cases where it is useful to know the general direction that a road takes leading from an intersection for explication of a routing maneuver. For example, in a case where a street starts out from an intersection in one direction and then curves off in another direction, it would be useful to explicate this maneuver as "Turn slight Right (or Left) to go Left (or Right) onto street B" or "Turn slight right/left to go northwest onto street B." This kind of routing explication can be provided if data were provided in the geographic database used by the navigation system that indicate an additional (or secondary) bearing for a certain distance from the end point. Accordingly, when forming a geographic database for a navigation system, an evaluation is made whether it would be useful to include additional (or secondary) bearing data that indicate the general direction that a road segment takes leading away from its end point.

Figure 14:
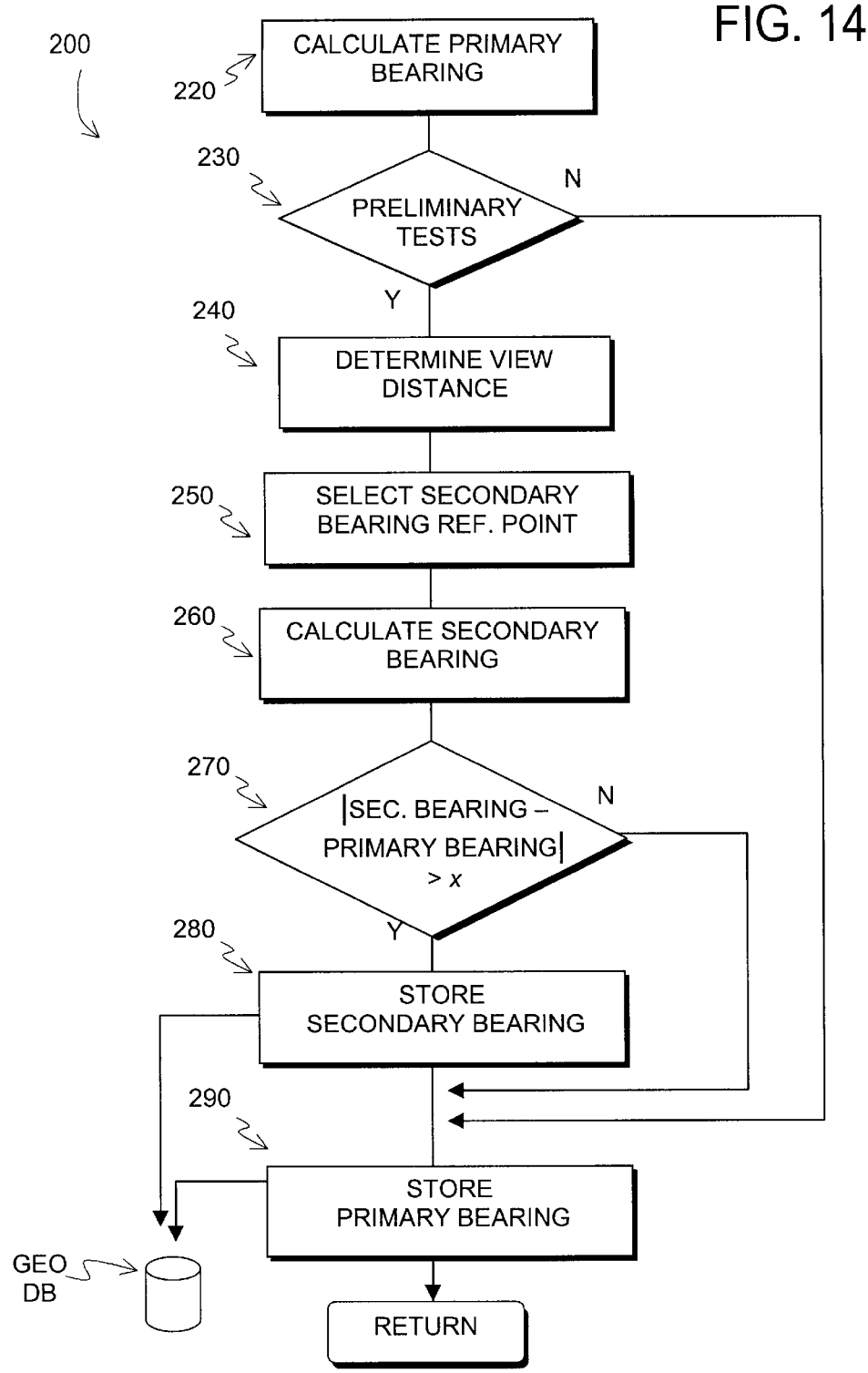
FIG. 14 is a flowchart that shows steps in a process for determining whether to store secondary bearing data in a geographic database.

FIG. 14 illustrates steps in a process 200 performed as part of the formation (i.e., compilation) of a geographic database for a navigation system. The process 200 is used for determining whether to include additional (or secondary) bearing data that indicate the general direction that a road segment takes leading away from its end point.

The process 200 is performed after the primary bearing for the segment end point has been determined (Step 220). The process 200 includes some preliminary tests that are used to rule out the need for determining a secondary bearing (Step 230). For example, a secondary bearing is not calculated for certain kinds of segments. As an example, in some cases, short segments are formed that represent pathways internal of an intersection. Additional bearing data are not calculated for such segments. Also, if the end point of the segment connects to only one other segment, additional bearing data are not calculated for that end of the segment because no guidance is necessary there.

If the segment passes the preliminary tests, a view distance is calculated (Step 240). View distance is an estimate of the distance of the driver's field of view as he/she approaches the intersection. The field of view represents a perception of the driver about the zone of possible maneuvers. According to one embodiment, the view distance is calculated based on the following formula:

$$V_d = (S_f * S_{fx} * W_l * L_f * N_d) + SW_{avg} + MW_{avg}$$

where, $V_d$ is the view distance, $S_f$ is a speed factor for each speed category of the road segment (meters/sec), $S_{fx}$ is an extra speed factor (=1 for regular intersections and 2 for roundabouts or other special traffic figures), $W_l$ is the width of each lane in meters (approximately 3 or 4 meters), $L_f$ is a lane factor based on lane category (i.e., average lanes in the category), $N_d$ is the number of directions for each road segment (i.e., one way or bi-directional), $SW_{avg}$ is the average shoulder width in meters (approximately 2 meters), and $MW_{avg}$ is the average median/divider width in meters (approximately 2 meters).

Figure 15:
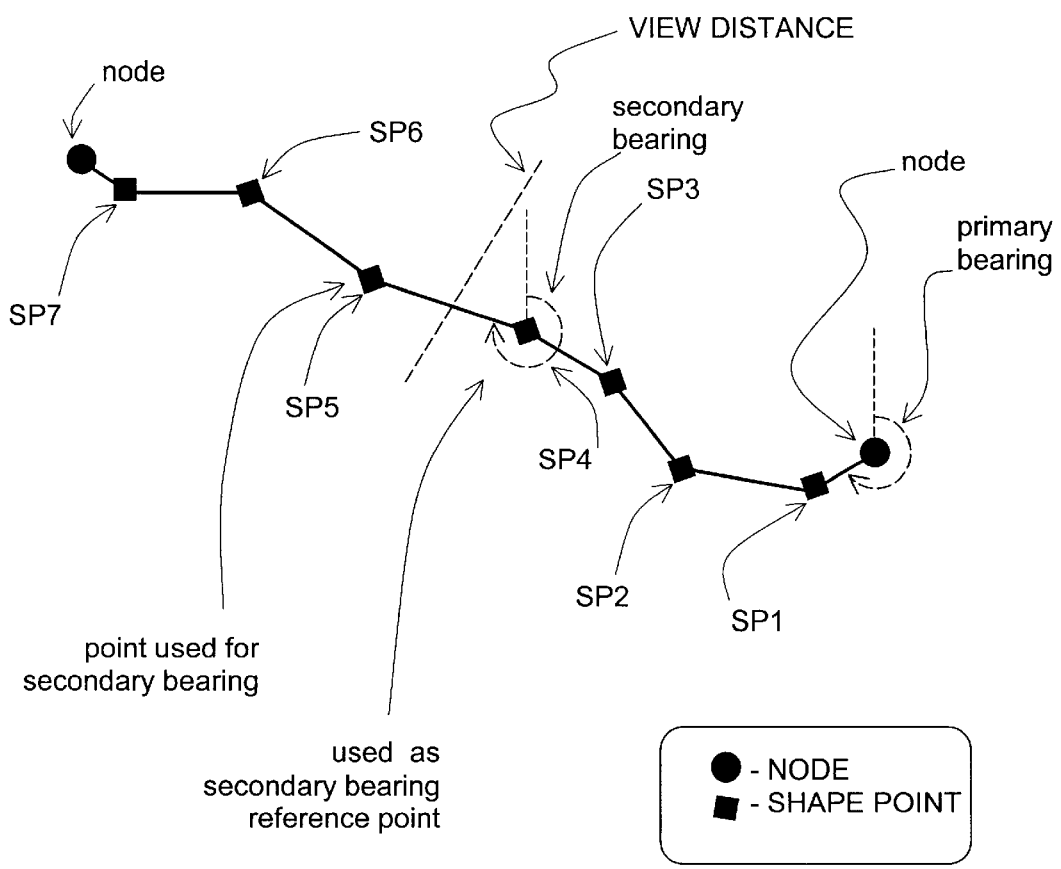
FIG. 15 is a graphical representation that illustrates determination of the secondary bearing.

Once the view distance is calculated, the shape point farthest from the node within the view distance is selected as the secondary reference point and a secondary bearing is calculated from the secondary reference point to the next point (shape point or node) along the segment (Steps 250 and 260). FIG. 15 illustrates determination of the secondary bearing.

Referring again to FIG. 14, if the secondary bearing does not deviate from the primary bearing by more than a predetermined amount, the segment is determined to be relatively straight and the secondary bearing is not needed (Step 270). (The predetermined amount by which the secondary bearing can deviate from the primary bearing before the need for the storing a value for the secondary bearing is established can be a consistent value determined by the geographic database developer. In one embodiment, the predetermined amount is approximately 20°. However, other values may be selected and used.) If it is determined that the secondary bearing is not needed, a value for the secondary bearing is not stored in the geographic database.

If the secondary bearing deviates from the primary bearing by more than the predetermined amount, the segment is determined to be not relatively straight and data indicating the secondary bearing are stored in the geographic database (Steps 270 and 280). When the secondary bearing data are stored in the geographic database, the secondary bearing data are associated with other data that represent the road segment. Data indicating the primary bearing are also stored in the geographic database (Step 290).

Figure 16:
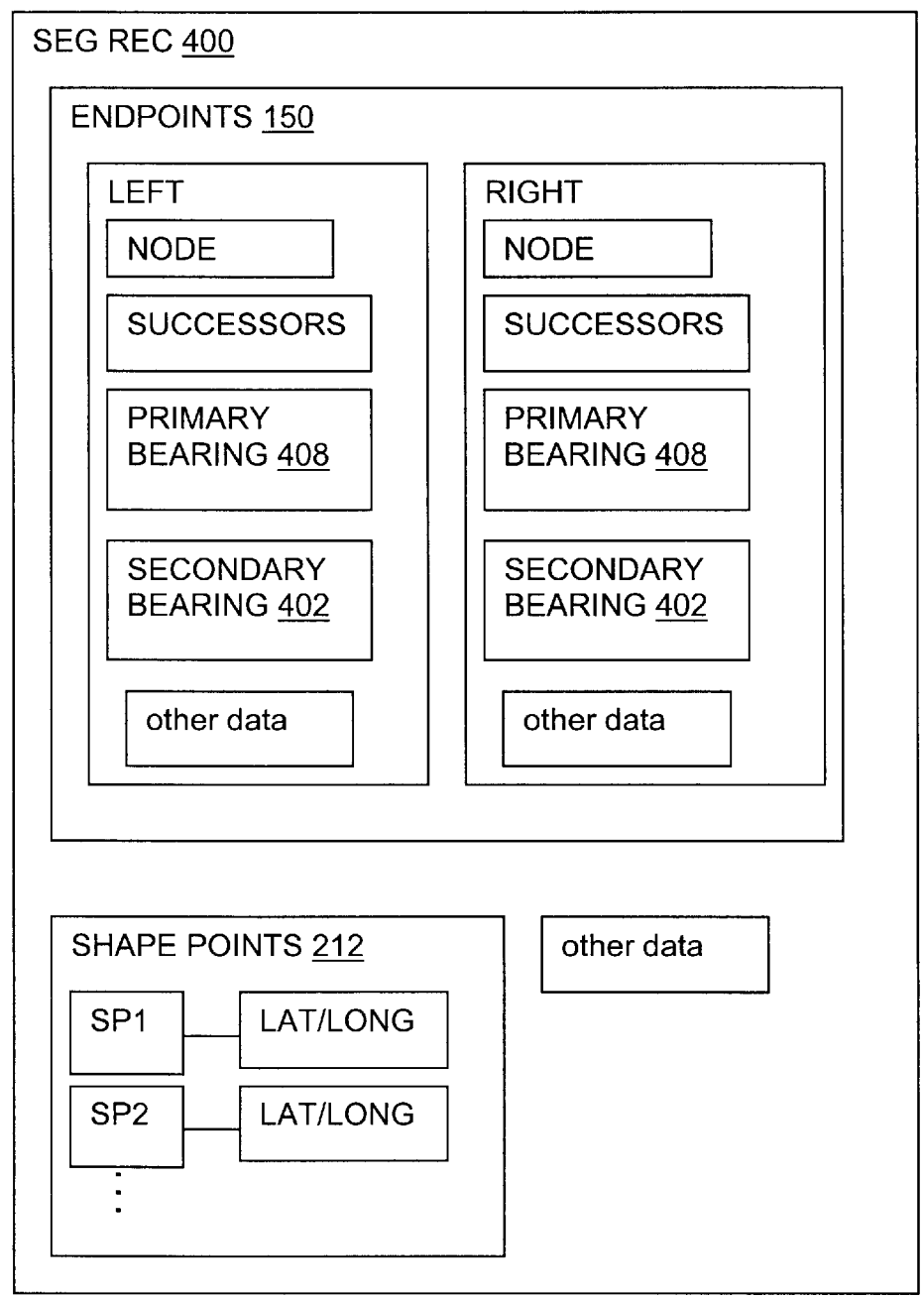
FIG. 16 is a block diagram that shows some of the components of a road segment data record that includes primary and secondary bearing data.

FIG. 16 shows components of a road segment data record 400 that includes secondary bearing data 402 in addition to primary bearing data 408.

IV. Navigation System Application

As explained above, when a navigation system provides guidance for following a route, an application in the navigation system uses data that pertain to each intersection in the route in order to determine whether guidance should be provided, and if so, what kind of guidance to provide. The primary and secondary bearing data are used by the navigation system application for several purposes. The navigation system application uses the primary bearing data to distinguish between multiple road segments leading away from an intersection in order to provide the vehicle driver with guidance indicating which road segment to follow. The primary bearing data can be useful for distinguishing road segments that are relatively close together (e.g., 45° or some other configurable angle). For example, if another road segment is close to the exit road segment, the driver is provided with a special warning to choose the proper exit segment.

When secondary bearing data are available for a road segment in a route, the navigation system application uses the combination of the primary and secondary bearing data for explication. For example, the combination of the primary bearing and secondary bearing data can be used to indicate the general direction of travel. The combination of the primary bearing and secondary bearing data can be used when a road segment changes direction, e.g., "Turn slight right to go left onto street B." The secondary bearing can also be used when providing routing guidance at roundabouts or special traffic figures.

As described above, when secondary bearing data are stored in a geographic database used by a navigation system, secondary bearing data are not necessarily stored for all the represented road segments. Instead, secondary bearing data are stored only when the secondary bearing deviates from the primary bearing by a predetermined amount, such as 20°. In a navigation system application that uses primary and secondary bearing data, a value for the general direction of the road segment can use the primary bearing unless a value for the secondary bearing is available.

V. Further Considerations

The embodiments disclosed herein relate to improved ways to determine bearing data contained in a geographic database used by a navigation system. These embodiments also include improved ways to use the bearing data contained in a geographic database used by a navigation system. The improved ways to determine and use bearing data relate primarily to curved road segments. For straight road segments (i.e., road segments that have no shape points defined between their end points), the bearing is determined in the same manner as described previously, i.e., by a straight line between opposite nodes.

VI. Alternatives

For purposes of this disclosure, navigation systems include dedicated systems, such as systems installed in vehicles and hand-held units. Navigation systems also include general purpose systems that run navigation-related applications. Such general purpose systems include personal computers (desktop or portable), personal digital assistants, portable phones, etc. Navigation systems include both networked and standalone systems.

The present specification discloses several embodiments for improving the way bearing data are determined. These embodiments can be used separately or in combination with each other. For example, a geographic database can include data that indicate only the primary bearing, only the secondary bearing, or both the primary and secondary bearing. Likewise, an application in a navigation system that uses bearing information can use only primary bearing data, only secondary bearing data, or both primary and secondary bearing data. Further, a navigation system application designed to use only primary bearing data can use a geographic database that includes both primary and secondary bearing data by ignoring the secondary bearing data which are present. Similarly, a navigation system application designed to use only secondary bearing data can use a geographic database that includes both primary and secondary bearing data by ignoring the primary bearing data which are present. Various other combinations may be supported.

In some of the embodiments disclosed above, it was described that data indicating the primary bearing or the secondary bearing are stored in a geographic database used by a navigation system. In an alternative embodiment, data indicating the primary bearing or the secondary bearing are not stored in a geographic database used by the navigation system. Instead, according to an alternative embodiment, an application in the navigation system calculates values for the primary bearing or the secondary bearing using geographic data that indicate the geometry (e.g., locations) of road segments.

Figure 17:
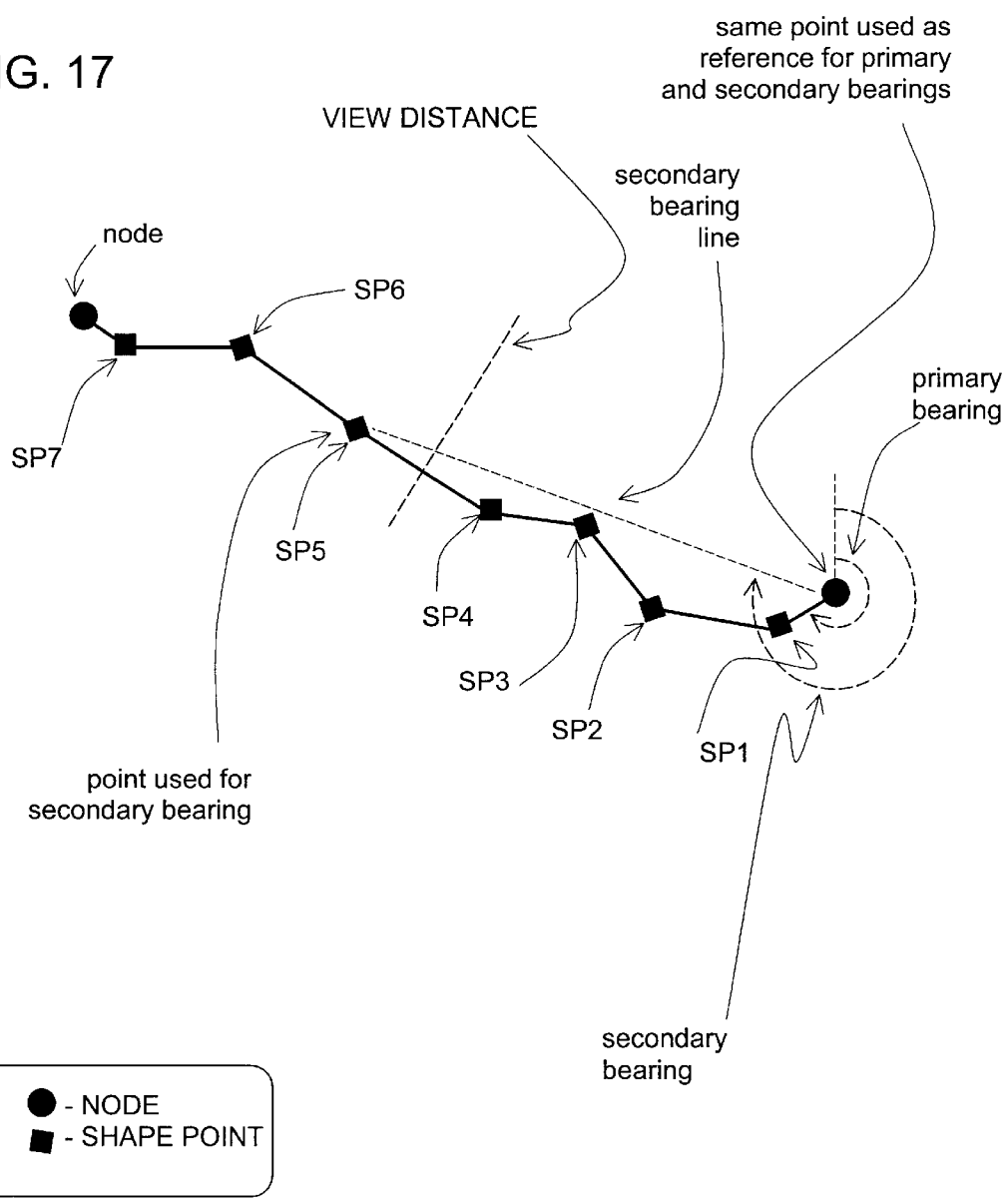
FIG. 17 is a graphical representation that illustrates determination of the secondary bearing according to an alternative embodiment.

In one of the embodiments described above, the secondary bearing was determined by selecting a point beyond a view distance and then calculating the bearing to that point from the point immediately prior thereto. FIG. 17 shows another way to determine the secondary bearing. In FIG. 17, a view distance is determined and the next point beyond the view distance is selected, as in the previous embodiment. In FIG. 17, the secondary bearing is determined to this point from the end point instead of from the point immediately prior thereto.

VII. Advantages

In prior systems, turn angle calculation was based on the angle produced by the first shape point to an end point of a segment. The embodiments disclosed herein allow a navigation system to calculate the turn angle based on how the road curvature is perceived by the driver as he/she approaches the intersection.

It is intended that the foregoing detailed description be regarded as illustrative rather than limiting and that it is understood that the following claims including all equivalents are intended to define the scope of the invention.

We claim:

1. A method of forming a geographic database containing data that represents road segments in a geographic area, the method comprising:

for at least some of the road segments, determining a view distance from one end point of the road segment;

selecting a secondary bearing reference point within the view distance;

determining a secondary bearing from the secondary bearing reference point to a second point along the road segment beyond the secondary bearing reference point in a direction away from the end point; and storing data that indicates the secondary bearing in the geographic database.

2. The method of claim 1 further comprising:

associating the data that indicates the secondary bearing with other data that represents the road segment in the geographic database.

3. The method of claim 1 wherein the secondary bearing reference point is selected from shape points located along the road segment between end points thereof.

4. The method of claim 3 wherein the secondary bearing reference point is the shape point located within the view distance that is farthest from the end point.

5. The method of claim 1 wherein the secondary bearing reference point is selected from shape points located along the road segment between end points thereof and the second point is selected from the shape points or the other end point of the road segment.

6. The method of claim 5 wherein the secondary bearing reference point is the shape point located within the view distance that is farthest from the end point.

7. The method of claim 6 wherein the second point is the shape point located immediately beyond the secondary reference point in a direction away from the end point.

8. The method of claim 5 wherein the second point is selected from shape points located along the road segment between end points thereof.

9. The method of claim 1 wherein the second point is selected from shape points located along the road segment between end points thereof.

10. The method of claim 1 further comprising:

storing data in the geographic database that indicates a primary bearing of the road segment at the one end point.

11. The method of claim 10 wherein the primary bearing is determined by
   selecting a primary bearing point within a primary range; and
   determining the primary bearing between the end point and the primary bearing point.

12. The method of claim 10 wherein the primary bearing is determined by
   selecting a primary reference point within a primary range, wherein the primary range is not less than approximately 5 meters from the end point; and
   determining the primary bearing between the end point and the primary reference point.

13. The method of claim 5 wherein the second point is selected from shape points located along the road segment between end points thereof.

14. The method of claim 1 wherein the view distance is equal to $$(S_f * S_{fx} * W_l * L_f * N_d) + SW_{avg} + MW_{avg}$$

where,
   $S_f$ is a speed factor for each speed category of the road segment,
   $S_{fx}$ is an extra speed factor equal to 1 for regular intersections and 2 for roundabouts,
   $W_l$ is a width of each lane,
   $L_f$ is a lane factor based on lane category,
   $N_d$ is a number of directions for each road segment,
   $SW_{avg}$ is an average shoulder width, and
   $MW_{avg}$ is an average median width.

15. A geographic database containing data that represents road segments in a geographic area,
   wherein at least some of the road segments are represented by data that indicate a secondary bearing,
   wherein the secondary bearing associated with a represented road segment is determined from a secondary bearing reference point to a second point along the represented road segment in a direction away from an end point of the represented road segment, and
   wherein the secondary bearing reference point is selected within a view distance from the end point of the represented road segment.

16. A navigation system that includes a route guidance application that uses a geographic database that contains data that represents road segments in a geographic area,
   wherein at least some of the road segments are represented by data that indicate a secondary bearing,
   wherein the secondary bearing associated with a represented road segment is determined from a secondary bearing reference point to a second point along the represented road segment in a direction away from an end point of the represented road segment, and
   wherein the secondary bearing reference point is selected within a view distance from the end point of the represented road segment.

17. A method of forming a geographic database containing data that represents road segments in a geographic area, the method comprising:
   for at least some of the road segments,
   storing data in the geographic database that indicates a primary bearing of the road segment at each end point thereof; and
   storing data in the geographic database that indicates a secondary bearing of the road segment at each end point thereof.

18. The method of claim 17 wherein the secondary bearing is determined by
   determining a view distance from an end point of the road segment;
   selecting a secondary bearing reference point within the view distance; and
   determining the secondary bearing as a bearing from the secondary bearing reference point to a second point along the road segment beyond the secondary bearing reference point in a direction away from the end point.

19. A geographic database that contains data that represents road segments in a geographic area,
   wherein at least some of the road segments are represented by data that indicate a primary bearing and a secondary bearing from an end point thereof,
   wherein the secondary bearing is determined by
   determining a view distance from the end point of the represented road segment;
   selecting a secondary bearing reference point within the view distance; and
   determining the secondary bearing as a bearing from the secondary bearing reference point to a second point along the represented road segment beyond the secondary bearing reference point in a direction away from the end point.

20. A navigation system that includes a route guidance application that uses a geographic database that contains data that represents road segments in a geographic area,
   wherein at least some of the road segments are represented by data that indicate a primary bearing and a secondary bearing from an end point thereof,
   wherein the secondary bearing is determined by
   determining a view distance from the end point of the represented road segment;
   selecting a secondary bearing reference point within the view distance; and
   determining the secondary bearing as a bearing from the secondary bearing reference point to a second point along the represented road segment beyond the secondary bearing reference point in a direction away from the end point.

21. A method of forming a geographic database that contains data that represents road segments in a geographic area, the method comprising:
   for at least some of the road segments,
   storing data in the geographic database that indicate a primary bearing of the road segment at each end point thereof,
   wherein the primary bearing at each end of the road segment is determined by
   for each end of the road segment, selecting a primary bearing point from shape points located along the road segment between end points thereof, wherein the shape point selected as the primary bearing point is that shape point farthest from the end point and within a primary range of distance therefrom, but if no shape point is located within the primary range, the shape point selected as the primary bearing point is the first shape point located beyond the primary range from the end point or the other end point; and
   determining as the primary bearing a bearing from the primary bearing point to the next point along the road segment away from the end point, wherein the next point is selected from shape points along the road segment or the other end point.

22. The method of claim 21 wherein the primary range is approximately 5 to 10 meters from the end point.

23. A geographic database that contains data that represents road segments in a geographic area, wherein at least some of the road segments are represented by data that indicate a primary bearing from an end point thereof, wherein the primary bearing of a represented road segment from a selected endpoint thereof is determined by selecting a primary bearing point from shape points located along the represented road segment between end points thereof, wherein the shape point selected as the primary bearing point is that shape point farthest from the end point and within a primary range of distance therefrom, but if no shape point is located within the primary range, the shape point selected as the primary bearing point is the first shape point located beyond the primary range from the end point or the other end point; and determining as the primary bearing a bearing from the primary bearing point to the next point along the represented road segment away from the end point, wherein the next point is selected from shape points along the road segment or the other end point;

wherein the primary range is approximately 5 to 10 meters from the end point.

24. A navigation system that includes a route guidance application that uses a geographic database that contains data that represents road segments in a geographic area, wherein at least some of the road segments are represented by data that indicate a primary bearing from an end point thereof, wherein the primary bearing of a represented road segment from a selected endpoint thereof is determined by selecting a primary bearing point from shape points located along the represented road segment between end points thereof, wherein the shape point selected as the primary bearing point is that shape point farthest from the end point and within a primary range of distance therefrom, but if no shape point is located within the primary range, the shape point selected as the primary bearing point is the first shape point located beyond the primary range from the end point or the other end point; and determining as the primary bearing a bearing from the primary bearing point to the next point along the represented road segment away from the end point, wherein the next point is selected from shape points along the road segment or the other end point; wherein the primary range is approximately 5 to 10 meters from the end point.

25. A method of forming a geographic database containing data that represents road segments in a geographic area, the method comprising:

for at least some of the road segments, determining a view distance from an end point at a first end of the road segment;

selecting a point along the road segment beyond the view distance as a secondary bearing point for the first end of the road segment;

determining a secondary bearing for the first end of the road segment using the secondary bearing point; and storing data that indicates the secondary bearing in the geographic database.

26. The method of claim 25 wherein the secondary bearing is determined from the end point at the first end of the road segment to the secondary bearing point.

27. The method of claim 25 wherein the secondary bearing is determined from a point within the view distance to the secondary bearing point.

28. The method of claim 25 wherein the secondary bearing is determined from a point within the view distance that is farthest from the end point at the first end of the road segment to the secondary bearing point.

29. The method of claim 25 wherein the secondary bearing point is selected from shape points located along the road segment between end points thereof or the opposite end point.

* * * * *